(12) United States Patent
Chum et al.

(10) Patent No.: US 6,906,141 B2
(45) Date of Patent: *Jun. 14, 2005

(54) POLYMER BLEND AND FABRICATED ARTICLE MADE FROM DIVERSE ETHYLENE INTERPOLYMERS

(75) Inventors: Pak-Wing S. Chum, Lake Jackson, TX (US); Kurt W. Swogger, Lake Jackson, TX (US); Thomas Oswald, Lake Jackson, TX (US); Pradeep Jain, Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/790,337

(22) Filed: Mar. 1, 2004

(65) Prior Publication Data

US 2004/0167286 A1 Aug. 26, 2004

Related U.S. Application Data

(63) Continuation of application No. 09/430,919, filed on Nov. 1, 1999, now Pat. No. 6,723,398.

(51) Int. Cl.⁷ .............................. C08F 8/00; C08L 23/00; C08L 23/04; D02G 3/00; B32B 27/08
(52) U.S. Cl. ............... 525/191; 525/240; 428/35.2; 428/35.5; 428/364; 428/373; 428/516
(58) Field of Search ................. 525/191, 240; 428/35.2, 35.5, 364, 373, 516

(56) References Cited

U.S. PATENT DOCUMENTS

| | | | |
|---|---|---|---|
| 3,456,044 A | 7/1969 | Pahlke | |
| 3,485,706 A | 12/1969 | Evans | |
| 3,645,992 A | 2/1972 | Elston | |
| 4,322,027 A | 3/1982 | Reba | |
| 4,340,563 A | 7/1982 | Appel et al. | |
| 4,352,849 A | 10/1982 | Mueller | |
| 4,413,110 A | 11/1983 | Kavesh et al. | |
| 4,597,920 A | 7/1986 | Golike | |
| 4,663,220 A | 5/1987 | Wisneski et al. | |
| 4,668,566 A | 5/1987 | Braun | |
| 4,798,081 A | 1/1989 | Hazlitt et al. | |
| 4,820,557 A | 4/1989 | Warren | |
| 4,837,084 A | 6/1989 | Warren | |
| 4,865,902 A | 9/1989 | Golike et al. | |
| 4,927,708 A | 5/1990 | Herran et al. | |
| 4,952,451 A | 8/1990 | Mueller | |
| 4,963,419 A | 10/1990 | Lustig et al. | |
| 5,008,204 A | 4/1991 | Stehling | |
| 5,059,481 A | 10/1991 | Lustig et al. | |
| 5,089,321 A | 2/1992 | Chum et al. | |
| 5,272,236 A | 12/1993 | Lai et al. | |
| 5,278,272 A | 1/1994 | Lai et al. | |
| 5,292,845 A | 3/1994 | Kawasaki et al. | |
| 5,747,594 A | 5/1998 | deGroot et al. | |
| 5,844,045 A | 12/1998 | Kolthammer et al. | |
| 6,723,398 B1 * | 4/2004 | Chum et al. ............... | 428/35.2 |

FOREIGN PATENT DOCUMENTS

| | | |
|---|---|---|
| EP | 0057238 A | 8/1982 |
| EP | 0572034 A | 12/1993 |
| WO | WO 90/03414 A | 4/1990 |
| WO | WO 9425523 A | 11/1994 |
| WO | WO 01/32771 A1 | 5/2001 |

OTHER PUBLICATIONS

Search Report, Feb. 12, 2001.

* cited by examiner

Primary Examiner—Nathan M. Nutter

(57) ABSTRACT

Polymer blends are described that include at least one first ethylene interpolymer and at least one second ethylene interpolymer wherein the difference in the number of carbon atoms in the comonomer of the first interpolymer and the comonomer of the second interpolymer is at least two, wherein the first interpolymer and/or the second interpolymer has molecular weight distribution of from about 1.8 to about 2.8; and wherein the polymer blend has a density greater than or equal to 0.90 g/cm³. Articles made from such blends are also disclosed.

20 Claims, 5 Drawing Sheets

*Dimensions in Inches*

*Dimensions in Inches*

POLYMER BLEND AND FABRICATED ARTICLE MADE FROM DIVERSE ETHYLENE INTERPOLYMERS

PRIOR RELATED APPLICATIONS

This is a continuation application of U.S. patent application Ser. No. 09/430,919, now U.S. Pat. No. 6,723,398, filed Nov. 1, 1999, which claims benefit of U.S. patent appl. Ser. Nos. 08/927,393, filed Aug. 27, 1997, and 08/544,497, now issued U.S. Pat. No. 5,677,383, filed Oct. 5, 1995, each of which is incorporated by reference herein in its entirety.

FIELD OF THE INVENTION

This invention relates to an ethylene polymer blend comprising at least two diverse ethylene interpolymers wherein one interpolymer has a lower number of carbons than the at least one other interpolymer. The ethylene polymer blend preferably comprises at least one homogeneously branched ethylene/α-olefin interpolymer blended with at least one heterogeneously branched ethylene/α-olefin interpolymer and is characterized as having a density greater than or equal to 0.90 g/cm$^3$ and an intrinsic tear value greater than or equal to 150 grams-force.

The inventive ethylene polymer blend can be used in various extruded forms and is particularly useful for film applications (for example, high strength thin gauge packaging film, impact resistant shrink film and heat sealable packaging film).

BACKGROUND OF THE INVENTION

Film products fabricated from linear low density polyethylene (LLDPE) or high density polyethylene (HDPE) are widely used for packaging applications such as merchandise bags, shrink films, grocery sacks, and industrial liners. For these applications, films with excellent toughness properties (that is, high tensile, impact or tear strengths) are desired to facilitate down gauging, prevent premature punctures during handling, distribution and use.

Previous attempts were made to optimize film tensile strength and yield strength by blending various heterogeneous polymers together on theoretical basis. While such blends exhibited a synergistic response to increase the film yield strength, the film impact strength followed the rule of mixing, often resulting in a "destructive synergism" (that is, the film impact strength was actually lower than film made from one of the two components used to make the blend).

For example, it is known that while improved modulus linear polyethylene polymer blends can be produced by blending high density polyethylene with a very low density polyethylene (VLDPE), the impact strength of these polymer blends typically follow the rule of mixing (or the "blend rule"). That is, the final composition exhibits properties that are comparable to and predictable from weight average calculations based on the component polymers. For example, see FIG. 5 herein.

It is also known from U.S. Pat. No. 5,677,383, the disclosure of which is incorporated herein by reference, that dramatic synergism results when polymer compositions are made from a homogeneously branched ethylene interpolymer having a high slope of strain hardening coefficient melt-blended with a heterogeneously branched ethylene polymer. Although U.S. Pat. No. 5,677,383 broadly discloses the homogeneously branched ethylene interpolymer and the heterogeneously branched ethylene polymer can comprise various comonomers, all of the presented examples consist of higher alpha olefin interpolymer combinations. Moreover, U.S. Pat. No. 5,677,383 focuses on the slope of strain hardening coefficient of the component polymers and is not directed to the slope of strain hardening coefficient of the final blend combinations.

It is also known that, at the equivalent densities, interpolymers comprised of higher alpha olefins provide improved toughness properties as compared to lower alpha olefin interpolymers. For example, at a density of about 0.935 g/cc, an ethylene/1-octene copolymer will exhibit an intrinsic tear that is about two times higher than that of an ethylene/1-butene copolymer having about the same density.

It is well established that higher alpha olefin interpolymers provide superior toughness. But with periodic scarcities in the availability of higher alpha olefin comonomers, resin producers and fabricators desire broader polymer options for providing polymer compositions characterized by excellent toughness properties. The need is especially great in regard to 1-octene, which is a higher alpha olefin that frequently tends to be in short supply while the lower alpha olefin 1-butene generally tends to be abundantly available. For polymer blends comprising at least two higher alpha olefin interpolymers, there is a particular need to substitute at least one of the higher alpha olefin interpolymers with a lower alpha olefin interpolymer and still retain the excellent toughness properties characteristic of higher alpha olefin polymer blends. For polymer blends comprising at least two higher alpha olefin interpolymers where one is a homogeneously branched ethylene interpolymer and the other is a heterogeneously branched ethylene polymer, there is an especially particular need to substitute at least one of the higher alpha olefin interpolymers with a lower alpha olefin interpolymer and still retain the excellent toughness properties characteristic of these polymer blends.

Surprisingly, we have now discovered that within a certain narrow density range, tailored combinations of at least one interpolymer comprised of a lower carbon comonomer blended with at least one interpolymer comprised of a higher carbon comonomer can provide toughness properties comparable to polymer blends comprised of two interpolymers, each having the same higher carbon comonomer or, alternatively, comparable to single interpolymer compositions where the interpolymer comprises a higher carbon comonomer.

Figure 6:
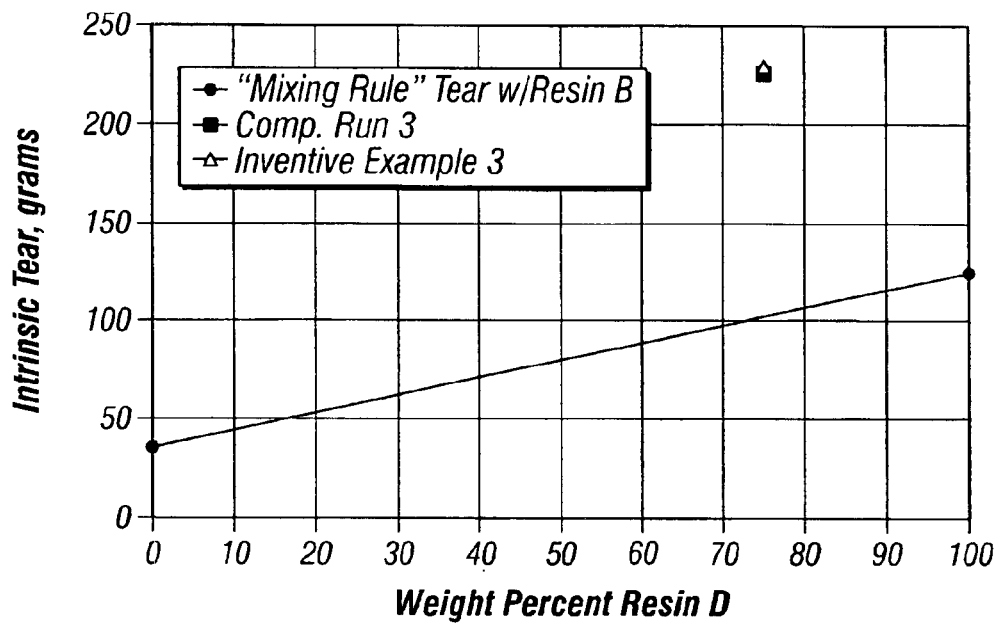

FIG. 6 shows, in regard to intrinsic tear (in grams), how dissimilar and similar interpolymer combinations compare to a "mixing rule" polymer blend of a homogeneously branched ethylene/1-octene copolymer (having a 0.8688 g/cc density) and heterogeneously branched ethylene/1-octene copolymer (having a 0.934 g/cc density).

Figure 7:
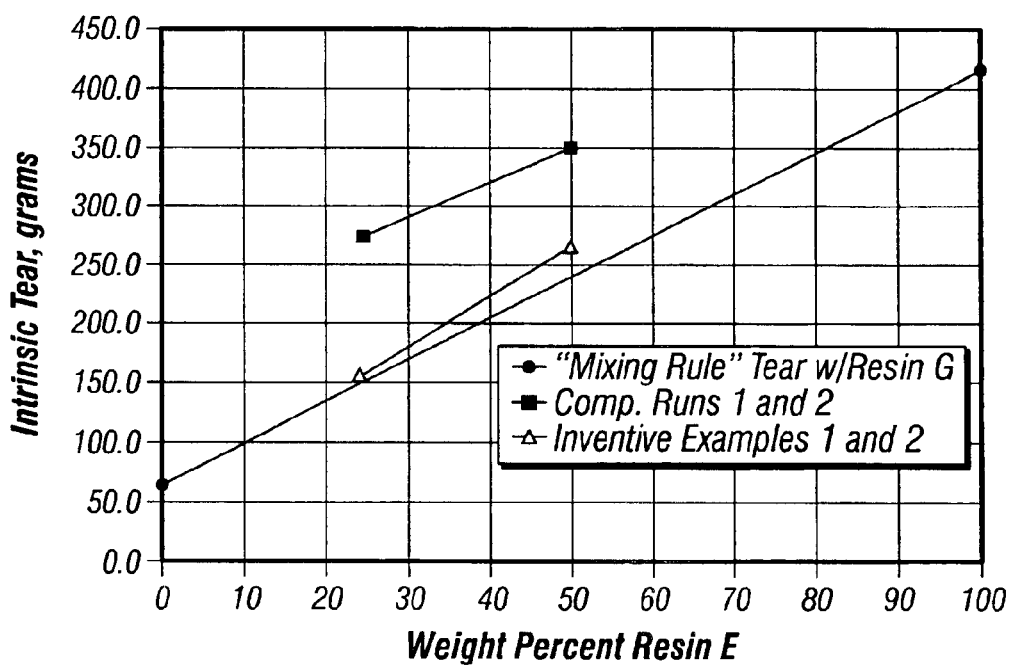

FIG. 7 shows, in regard to intrinsic tear (in grams), how dissimilar and similar interpolymer combinations compare to a "mixing rule" polymer blend of a homogeneously branched ethylene/1-octene copolymer (having a 0.909 g/cc density) and heterogeneously branched ethylene/1-butene copolymer (having a 0.936 g/cc density).

Figure 8:
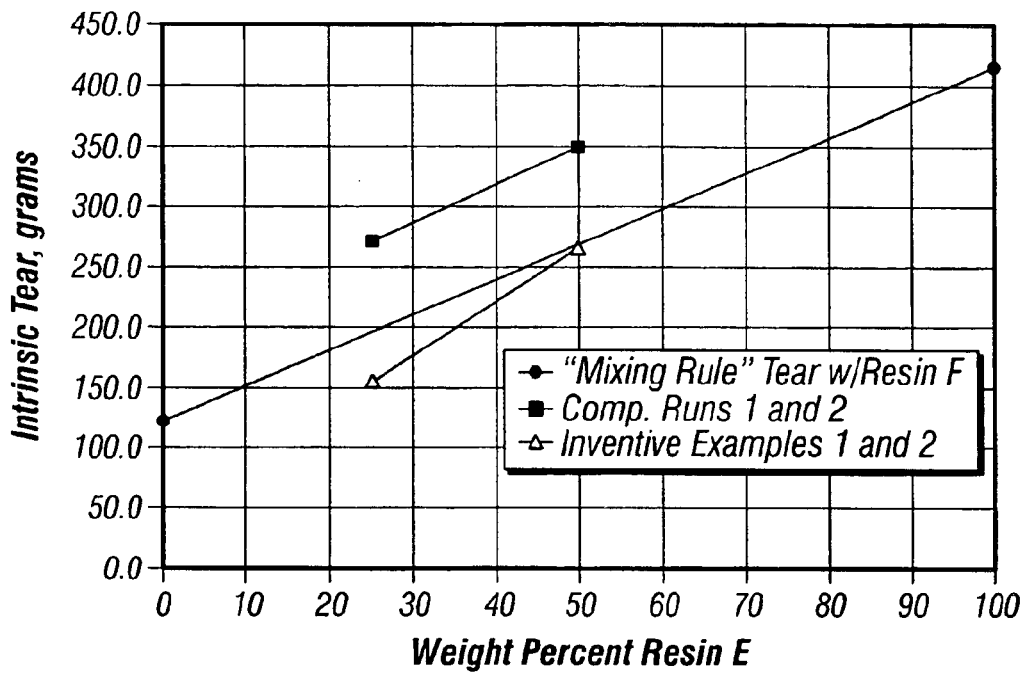

FIG. 8 shows, in regard to intrinsic tear (in grams), how dissimilar and similar interpolymer combinations compare to a "mixing rule" polymer blend of a homogeneously branched ethylene/1-octene copolymer (having a 0.909 g/cc density) and heterogeneously branched ethylene/1-octene copolymer (having a 0.935 g/cc density).

Figure 9:
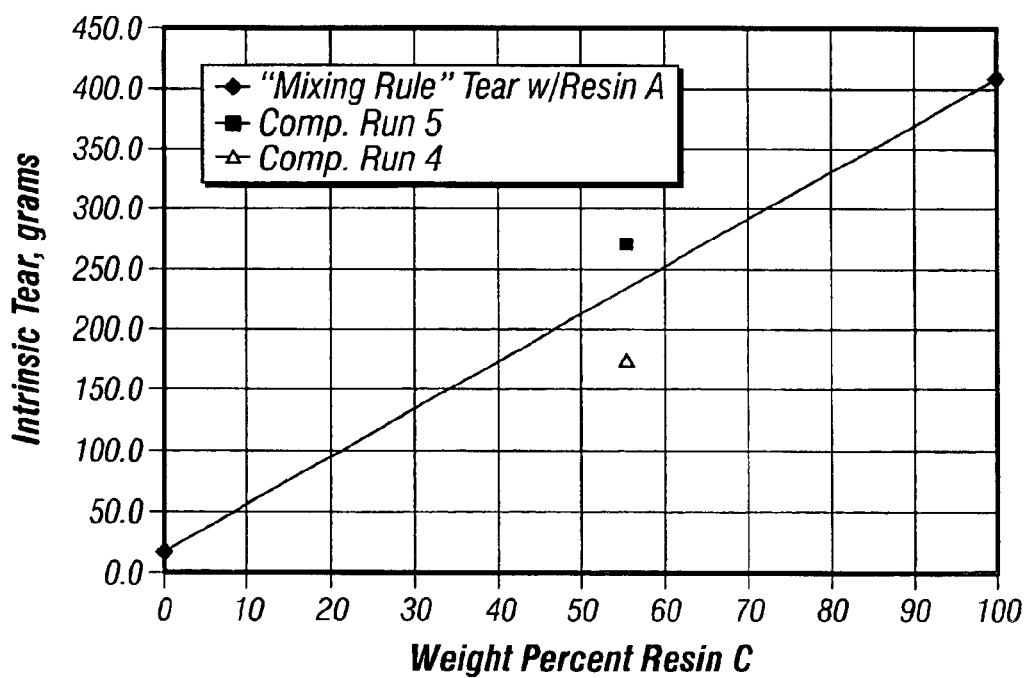

FIG. 9 shows, in regard to intrinsic tear (in grams), how dissimilar and similar interpolymer combinations compare to a "mixing rule" polymer blend of a homogeneously branched ethylene/1-octene copolymer (having a 0.8714 g/cc density) and heterogeneously branched ethylene/1-octene copolymer (having a 0.920 g/cc density).

SUMMARY OF THE INVENTION

Formulated ethylene interpolymer compositions comprised of dissimilar interpolymers where at least one interpolymer comprises a lower carbon comonomer relative to the other interpolymer (or interpolymers), have now been discovered to have improved physical and mechanical strength and are useful in making fabricated articles. These novel compositions exhibit surprisingly good toughness properties which are comparable to synergistic interpolymer compositions comprised of two interpolymers, each having the same higher carbon comonomer; or comparable to "mixing rule" polymer blends comprised two interpolymers, each having the same higher carbon comonomer; or comparable to single polymer compositions comprised higher carbon comonomers.

The broad aspect of the invention is a diverse interpolymer composition comprising (A) from about 5 percent (by weight of the total composition) to about 95 percent (by weight of the total composition) of at least one first ethylene interpolymer, and (B) from about 95 percent (by weight of the total composition) to about 5 percent (by weight of the total composition) of at least one second ethylene interpolymer;

wherein the first interpolymer is characterized as comprising a different comonomer relative to the second interpolymer, one interpolymer is a homogeneously branched ethylene interpolymer and the other interpolymer is a heterogeneously branched ethylene interpolymer or a homogeneously branched ethylene interpolymer, and the composition is characterized as having a density greater than or equal to 0.90 g/cm³.

In another aspect, the diverse interpolymer composition comprises (A) from about 5 percent (by weight of the total composition) to about 95 percent (by weight of the total composition) of at least one first ethylene interpolymer, and (B) from about 95 percent (by weight of the total composition) to about 5 percent (by weight of the total composition) of at least one second ethylene interpolymer;

wherein the first interpolymer is characterized as comprising a different comonomer relative to the second interpolymer and as having a lower density relative to the second interpolymer; the second interpolymer is characterized as having a density less than or equal to 0.95 g/cm3;

wherein one interpolymer is a homogeneously branched ethylene interpolymer and the other interpolymer is a heterogeneously branched ethylene interpolymer or a homogeneously branched ethylene interpolymer; and wherein the composition is characterized as having a density in the range of from greater than or equal to 0.90 g/cc to about 0.935 g/cc.

In certain preferred embodiments of the present invention, preferably, at least the first interpolymer or the second interpolymer or both have a slope of strain hardening coefficient greater than or equal to 1.3, more preferably greater than or equal to 1.5. In other preferred embodiments, the diverse interpolymer composition has an intrinsic tear value greater than or equal to 150 grams, preferably greater than or equal to 200 grams, more preferably greater than or equal 225 grams, or a slope of strain hardening coefficient greater than or equal to 0.85, preferably greater than or equal to 0.95, more preferably greater than or equal to 1.

In still other preferred embodiments, especially when balanced properties are desired, the first interpolymer comprises a lower carbon comonomer. More preferably, the first interpolymer comprises a lower carbon comonomer and is a homogeneously branched ethylene interpolymer. Most preferably, the first interpolymer comprises a lower carbon comonomer and is a substantially linear ethylene interpolymer.

DETAILED DESCRIPTION OF THE INVENTION

The term "lower carbon comonomer" is used herein in reference to a comonomer that has a lower total number of carbons relative to another comonomer. Similarly, the term "higher carbon comonomer" is used herein in reference to a comonomer that has a higher total number of carbons relative to another comonomer. The term "higher carbon comonomer" is a generic reference that embraces the term "higher α-olefin" and the term "lower carbon comonomer" is a generic term that embraces the term "lower α-olefin". Thus, for example, 1-octene is would be a higher carbon comonomer (as well as a higher α-olefin) relative to 1-butene and, conversely, 1-butene would be a lower carbon comonomer (as well as a lower α-olefin) relative to 1-octene. Also, 1-octene would be a "different comonomer" (as this term is used herein) relative to 1-butene.

By the term "comparable toughness properties" it is meant that the intrinsic tear of the inventive diverse interpolymer composition, as determined in accordance with ASTM D-1922, Method A), is within 35 percent, preferably 25 percent, more preferably 12 percent of the intrinsic tear of a comparative "mixing rule" polymer blend wherein the compared polymer blend is comprised two interpolymers, each having the same higher carbon comonomer. Comparable intrinsic tear performance is considered to be a surprisingly substantial improvement because ordinarily interpolymers comprised higher carbon comonomers are expected to exhibit vastly superior toughness properties over interpolymers based on lower carbon comonomer.

The term "mixing rule" as discussed above is used herein to refer to polymer blend property results attainable from fractional weight average calculations based on the properties of the component polymers of the polymer blend.

The density of the inventive diverse interpolymer composition (as measured in accordance with ASTM D-792) is generally from greater than or equal to 0.90 g/cm$^3$. Preferably, in the range of from greater than or equal to 0.90 g/cm$^3$ to about 0.935 g/cm$^3$, more preferably from greater than or equal to 0.90 g/cm$^3$ to less than or equal to 0.925 g/cm$^3$, most preferably from about 0.905 g/cm$^3$ to about 0.925 g/cm$^3$, and especially from about 0.905 g/cm$^3$ to than about 0.92 g/cm$^3$.

The I$_2$ melt index of the inventive diverse interpolymer composition is preferably in the range of from about 0.1 to about 100 g/10 minutes, more preferably in the range of from about 0.2 to 10 g/10 minutes, most preferably less than or equal to 2.5 g/10 minutes.

The inventive diverse interpolymer composition can be alternately or further characterized as having an intrinsic tear (as measured in accordance with ASTM D-1922, Method A) preferably greater than or equal to 150 grams, more preferably greater than or equal to 200 grams and most preferably greater than or equal to 225 grams, and especially greater than or equal to 250 grams.

Preferably, the carbon difference between the at least one comonomer of the first interpolymer and the at least one comonomer of the second interpolymer is greater than 2, especially greater than or equal to 3, most especially greater than or equal to 4. Especially preferred are copolymer combinations (that is, each interpolymer comprises ethylene with only one other comonomer). More especially preferred are copolymer combinations comprising 1-octene (for example combinations of 1-octene with 1-pentene, 1-octene with 1-butene and 1-octene with propylene). Most especially preferred are copolymer combinations comprising 1-octene and 1-butene (for example, a substantially linear ethylene/ 1-octene copolymer blended with a heterogeneously branched ethylene/1-butene copolymer).

The homogeneously branched ethylene interpolymer is preferably a substantially linear ethylene/α-olefin or diolefin interpolymer, as described in U.S. Pat. No. 5,272,236 and U.S. Pat. No. 5,278,272, the disclosures of both of which are incorporated herein by reference. The homogeneously branched ethylene interpolymer can also be a linear ethylene interpolymer (that is, characterized as having no long chain branching and certain less than 0.01 long chain branch per 1000 carbon atoms) as described, for example, in U.S. Pat. No. 3,645,992 (Elston), the disclosure of which is incorporated herein by reference.

Substantially linear ethylene interpolymers are not "linear" polymers in the traditional sense of the term and as used to describe linear low density polyethylene (for example, Ziegler polymerized linear low density polyethylene (LLDPE)). Nor are substantially linear ethylene interpolymers highly branched polymers, as used to describe high pressure, free-radical initiated low density polyethylene (LDPE).

The homogeneously branched ethylene interpolymers useful for forming the diverse interpolymer composition described herein are those in which the comonomer is randomly distributed within a given interpolymer molecule and wherein substantially all of the interpolymer molecules have the same ethylene/comonomer ratio within that interpolymer. The homogeneity of homogeneously branched ethylene interpolymers (either substantially linear ethylene interpolymers or homogeneously branched linear ethylene interpolymers) is typically described by the SCBDI (Short Chain Branch Distribution Index) or CDBI (Composition Distribution Branch Index).

SCBDI is defined as the weight percent of the polymer molecules having a comonomer content within 50 percent of the median total molar comonomer content and represents a comparison of the comonomer distribution in the interpolymer to the comonomer distribution expected for a Bernoullian distribution. The SCBDI of an interpolymer can be readily calculated from TREF as described, for example, by Wild et al., *Journal of Polymer Science. Poly. Phys. Ed.*, Vol. 20, p. 441 (1982), or in U.S. Pat. No. 4,798,081; 5,008,204; or by L. D. Cady, "The Role of Comonomer Type and Distribution in LLDPE Product Performance," SPE Regional Technical Conference, Quaker Square Hilton, Akron, Ohio, October 1–2, pp.107–119 (1985), the disclosures of all which are incorporated herein by reference.

The preferred TREF technique does not include purge quantities in SCBDI calculations. More preferably, the comonomer distribution of the interpolymer and SCBDI are determined using $^{13}$C NMR analysis in accordance with techniques described in U.S. Pat. Nos. 5,292,845; 4,798,081; 5,089,321 and by J. C. Randall, *Rev. Macromol. Chem. Phys.*, C29, pp. 201–317, the disclosures of all of which are incorporated herein by reference.

In analytical temperature rising elution fractionation analysis (as described in U.S. Pat. No. 4,798,081 and abbreviated herein as "ATREF"), the film or composition to be analyzed is dissolved in a suitable hot solvent (e.g., trichlorobenzene) and allowed to crystallized in a column containing an inert support (stainless steel shot) by slowly reducing the temperature. The column is equipped with both a refractive index detector and a differential viscometer (DV) detector. An ATREF-DV chromatogram curve is then generated by eluting the crystallized polymer sample from the column by slowly increasing the temperature of the eluting solvent (trichlorobenzene). The ATREF curve is also frequently called the short chain branching distribution (SCBD), since it indicates how evenly the comonomer (e.g., octene) is distributed throughout the sample in that as elution temperature decreases, comonomer content increases. The refractive index detector provides the short chain distribution information and the differential viscometer detector provides an estimate of the viscosity average molecular weight. The short chain branching distribution and other compositional information can also be determined using crystallization analysis fractionation such as the CRYSTAF fractionalysis package available commercially from PolymerChar, Valencia, Spain.

The SCBDI for the homogeneously branched linear ethylene interpolymer and the substantially linear ethylene interpolymers used in the present invention is preferably greater than 50 percent, especially greater than 70 percent and most especially greater than 90 percent. That is, by the term "homogeneously branched ethylene interpolymer" it is meant an ethylene interpolymer having a SCBDI greater than 50 percent.

Preferred homogeneously branched ethylene interpolymers useful in this invention also essentially lack a measurable "linear", "high density" or "crystalline" polymer fraction as measured by the TREF technique (that is, preferred homogeneously branched ethylene interpolymers do not contain a polymer fraction with a degree of branching less than or equal to 2 methyls/1000 carbons). More preferably, the homogeneously branched ethylene interpolymers also do not contain any highly short chain branched fraction (that is, more preferred homogeneously branched ethylene interpolymers do not contain a polymer fraction with a degree of branching equal to or more than about 30 methyls/1000 carbons). Although suitable for use in the present invention and not the preferred (or more preferred), commercial examples of homogeneously branched ethylene interpolymers having a "linear", "high density" or "crystalline" polymer fraction include certain grades of EXCEED resins supplied by Exxon Chemical Company.

The homogeneously branched ethylene interpolymers and heterogeneously branched ethylene interpolymers for use in the present invention typically are interpolymers of ethylene with at least one $C_3$–$C_{20}$ α-olefin or $C_4$–$C_{18}$ diolefin. Copolymers of ethylene and 1-octene are especially preferred. The term "interpolymer" is used herein to indicate a copolymer, or a terpolymer, or the like. That is, at least one other comonomer is polymerized with ethylene to make the interpolymer. Ethylene copolymerized with two or more comonomers can also be used to make the homogeneously branched substantially linear interpolymers useful in this invention. Preferred comonomers include the $C_3$–$C_{20}$ α-olefins, especially propylene, isobutylene, 1-butene, 1-hexene, 4-methyl-1-pentene, 1-heptene, 1-octene, 1-nonene, and 1-decene, more preferably 1-butene, 1-hexene, 4-methyl-1-pentene and 1-octene.

The term "linear ethylene interpolymer" means that the interpolymer does not have long chain branching. That is, the linear ethylene interpolymer has an absence of long chain branching. The term "linear ethylene interpolymer" does not refer to high pressure branched, free-radical initiated polyethylene (LDPE) which is known to those skilled in the art to have numerous long chain branches. The comonomer branching distribution of homogeneously branched linear ethylene interpolymers is the same or substantially the same as that described for the substantially linear ethylene/interpolymers, with the exception that the linear ethylene interpolymers do not have any long chain branching.

Substantially linear ethylene interpolymers have a single melting point, as opposed to traditional heterogeneously branched Ziegler polymerized ethylene interpolymers which have two or more melting points, as determined using differential scanning calorimetry (DSC). Most (but not all) homogeneously branched linear ethylene interpolymers also have a single DSC melting point. Those homogeneously branched linear ethylene interpolymers that have a "linear", "high density" or "crystalline" polymer fraction in TREF testing, generally have more than one DSC melting point. Homogeneously branched ethylene polymers having a single DSC melting point in the temperature range of –30° to 150° C. are preferred for use in the present invention.

Preferably, the first interpolymer has a lower density than the second interpolymer. More preferably, the density of the first interpolymer, as measured in accordance with ASTM D-792, for use in the present invention is especially from about 0.89 g/cm$^3$ to about 0.935 g/cm$^3$, more especially from about 0.90 g/cm$^3$ to about 0.925 g/cm$^3$, most especially from about 0.905 g/cm$^3$ to about 0.925 g/cm$^3$, and most particularly from about 0.905 g/cm$^3$ to than about 0.92 g/cm$^3$.

The amount of the first interpolymer and second interpolymer incorporated into the inventive diverse interpolymer composition varies depending upon the desired melt index and targeted density of the final composition. But preferably, the interpolymer composition comprises from greater than 20 weight percent to about 95 weight percent (based on the total weight of the composition) of the first interpolymer and from less than 80 weight percent to about 5 weight percent (based on the total weight of the composition) of the second interpolymer. More preferably, the interpolymer composition comprises from greater than 25 weight percent to about 85 weight percent (based on the total weight of the composition) of the first interpolymer and from less than 75 weight percent to about 15 weight percent (based on the total weight of the composition) of the second interpolymer.

The molecular weight of the homogeneously branched ethylene interpolymer or the heterogeneously branched ethylene interpolymer for use in the present invention is conveniently indicated using a melt index measurement according to ASTM D-1238, Condition 190° C./2.16 kg (formerly known as "Condition (E)" and also known as $I_2$). Melt index is inversely proportional to the molecular weight of the polymer. Thus, the higher the molecular weight, the lower the melt index, although the relationship is not linear. The lower melt index limit for the ethylene interpolymers useful herein is preferably about 0.001 grams/10 minutes (g/10 min). The upper melt index limit is preferably about 10 g/10 min, preferably less than about 1 g/10 min, and especially less than about 0.5 g/10 min. Most preferably, the first interpolymer is a homogeneously branched ethylene interpolymer having an $I_2$ melt index equal to or lower than that of the second interpolymer which would be a heterogeneously branched ethylene interpolymer.

Another measurement useful in characterizing the molecular weight of the ethylene interpolymers is conveniently indicated using a melt index measurement according to ASTM D-1238, Condition 190° C./10 kg (formerly known as "Condition (N)" and also known as $I_{10}$). The ratio of the $I_{10}$ and $I_2$ melt index terms is the melt flow ratio and is designated as $I_{10}/I_2$.

Generally, the $I_{10}/I_2$ ratio for the homogeneously branched linear ethylene interpolymers is about 5.6.

For the substantially linear ethylene interpolymers used in the compositions of the invention, the $I_{10}/I_2$ ratio indicates the degree of long chain branching; that is, the higher the $I_{10}/I_2$ ratio, the more long chain branching in the interpolymer. Generally, the $I_{10}/I_2$ ratio of the branched substantially linear ethylene interpolymers is at least about 6, preferably at least about 7, especially at least about 8 or above. For the homogeneously branched substantially linear ethylene interpolymers, the higher the $I_{10}/I_2$ ratio, the better the processability.

The rheological processing index (PI), onset of surface and gross melt fracture are measured using a gas extrusion rheometer (GER). The GER is described by M. Shida, R. N. Shroff and L. V. Cancio in *Polym. Eng. Sci.*, Vol. 17, no. 11, p. 770 (1977), and in *Rheometers for Molten Plastics* by John Dealy, published by Van Nostrand Reinhold Co. (1982) on pages 97–99, the disclosures of both of which are incorporated herein by reference. PI testing is performed at a temperature of 190° C., at nitrogen pressure of 2500 psig using 0.0296 inch diameter, 20:1 L/D die having an entrance angle of 180°. The GER processing index is calculated in millipoise units from the following equation:

$$PI=2.15\times10^6 \text{ dynes/cm}^2/(1000\times\text{shear rate}),$$

where: $2.15\times10^6$ dynes/cm$^2$ is the shear stress at 2500 psi, and the shear rate is the shear rate at the wall as represented by the following equation:

$$32 \ Q'/(60 \text{ sec/min})(0.745)(\text{Diameter}\times2.54 \text{ cm/in})^3, \text{ where:}$$

Q' is the extrusion rate (gms/min), 0.745 is the melt density of polyethylene (gm/cm$^3$), and Diameter is the orifice diameter of the capillary (inches).

The PI is the apparent viscosity of a material measured at apparent shear stress of 2.15×10$^6$ dyne/cm$^2$.

For the substantially linear ethylene interpolymers used herein, the PI is preferably less than or equal to 70 percent of that of a comparative linear ethylene interpolymer; that is, a homogeneously branched linear ethylene interpolymer having about the same $I_2$ and $M_w/M_n$.

An apparent shear stress vs. apparent shear rate plot is used to identify the melt fracture phenomena. According to Ramamurthy in *Journal of Rheology*, 30(2), pages 337–357 (1986), above a certain critical flow rate, the observed extrudate irregularities may be broadly classified into two main types: surface melt fracture and gross melt fracture.

Surface melt fracture occurs under apparently steady flow conditions and ranges in detail from loss of specular gloss to the more severe form of "sharkskin". In this disclosure, the onset of surface melt fracture is characterized at the beginning of losing extrudate gloss at which the surface roughness of extrudate can only be detected by 40×magnification. The critical shear rate at onset of surface melt fracture for the substantially linear olefin polymers is at least 50 percent greater than the critical shear rate at the onset of surface melt fracture of a comparative linear ethylene interpolymer; that is, a homogeneously branched linear ethylene interpolymer having about the same $I_2$ and $M_w/M_n$.

Gross melt fracture occurs at unsteady flow conditions and ranges in detail from regular (alternating rough and smooth, helical, etc.) to random distortions. For commercial acceptability, (e.g., in blown film products), surface defects should be minimal, if not absent. The critical shear rate at onset of surface melt fracture (OSMF) and onset of gross melt fracture (OGMF) will be used herein based on the changes of surface roughness and configurations of the extrudates extruded by a GER.

GER testing for melt fracture determinations is performed at a temperature of 190° C., at nitrogen pressures between 5250 to 500 psig using a 0.0296 inch diameter, 20:1 L/D die having an entrance angle of 180°.

Substantially linear ethylene interpolymers suitable for use herein are characterized as having:

(a) a melt flow ratio, $I_{10}/I_2 \geq 5.63$, (b) a molecular weight distribution, $M_w/M_n$, as determined by gel permeation chromatography and defined by the equation:

$$(M_w/M_n) \leq (I_{10}/I_2) - 4.63,$$

(c) a gas extrusion rheology such that the critical shear rate at onset of surface melt fracture for the substantially linear ethylene interpolymer is at least 50 percent greater than the critical shear rate at the onset of surface melt fracture for a comparative homogeneously branched linear ethylene interpolymer, wherein the substantially linear ethylene interpolymer and the homogeneously branched linear ethylene interpolymer comprise the same comonomer or comonomers, the homogeneously branched linear ethylene interpolymer has an $I_2$ and $M_w/M_n$ within ten percent of the substantially linear ethylene interpolymer and wherein the respective critical shear rates of the interpolymers are measured at the same melt temperature, under the same nitrogen load using a gas extrusion rheometer, and (d) a single differential scanning calorimetry, DSC, melting peak between −30° and 150° C.

Molecular Weight Distribution Determination

The molecular weight distribution of the ethylene interpolymers is analyzed by gel permeation chromatography (GPC) on a Waters 150C high temperature chromatographic unit equipped with three mixed porosity columns (Polymer Laboratories 10$^3$, 10$^4$, 10$^5$, and 10$^6$), operating at a system temperature of 140° C. The solvent is 1,2,4-trichlorobenzene, from which 0.3 percent by weight solutions of the samples are prepared for injection. The flow rate is 1.0 milliliter/minute and the injection size is 200 microliters. A differential refractometer is being used as the detector.

The molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science*, Polymer Letters, Vol. 6, p. 621, 1968, the disclosure of which is incorporated herein by reference) to derive the following equation:

$$M_{polyethylene} = a*(M_{polystyrene})^b.$$

In this equation, a=0.4316 and b=1.0. Weight average molecular weight, $M_w$, is calculated in the usual manner according to the following formula: $M_j = (\Sigma w_i (M_i^j))^j$; where $w_i$ is the weight fraction of the molecules with molecular weight $M_i$ eluting from the GPC column in fraction i and j=1 when calculating $M_w$ and j=−1 when calculating $M_n$.

For the homogeneously branched ethylene interpolymers used herein, the molecular weight distribution ($M_w/M_n$) is thought not to be critical but preferably the molecular weight distribution, as determined using gel permeation chromatography (GPC), is from about 1.8 to about 2.8, more preferably from about 1.89 to about 2.2 and especially less than 2.

Determination of the Slope of Strain Hardening Coefficient

Figure 1A:
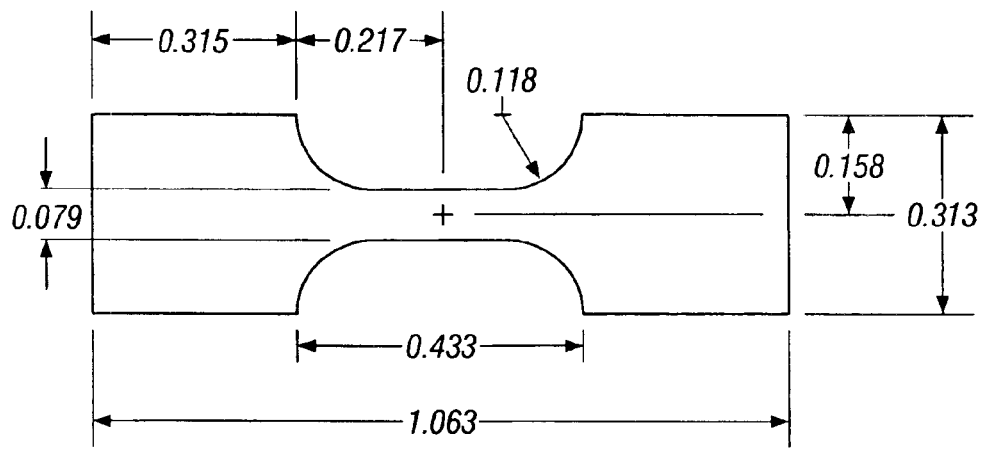
FIGS. 1A and 1B are diagrams of test dogbones used for determining the slope of strain hardening coefficient.
Figure 1B:
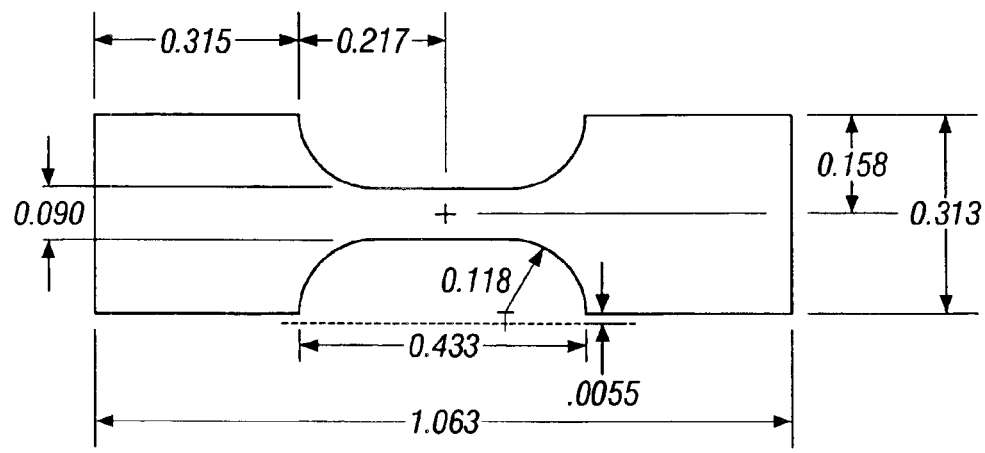

The slope of strain hardening is measured by compression molding a plaque from the polymer to be tested. Typically, the plaque is molded at about 190° C. for 4 minutes under almost no pressure and then pressed for 3 minutes under a pressure of about 20,000 psi. The plaque is then allowed to cool at about 8° C./minute under about 2,000 psi pressure. The molded plaque has a thickness of from about 0.005 to about 0.007 inches. The plaque is then cut into a dogbone shaped test piece using a suitable die. A suitable test piece is 0.315 inches wide and 1.063 inches long. The start of the curved portion of the dogbone shape begins at 0.315 inches from each end of the sample and gently curves (i.e., tapers) to an interior width of from about 0.079 to about 0.090 inches. The curve ends at a point 0.118 inches from the start of the curve such that the interior portion of the dogbone test piece has a length of 0.197 inches. FIGS. 1A and 1B show scale diagrams of suitable test dogbones.

The tensile properties of the test sample are tested on an Instron Tensile Tester at a crosshead speed of 1 inch/minute. The slope of strain hardening is calculated from the resulting tensile curve by drawing a line parallel to the strain hardening region (i.e. a 10 percent secant tangent line). The strain hardening region occurs after the sample has pulled its initial load (usually with little or no elongation during the initial load) and after the sample has gone through a slight drawing stage (usually with little or no increase in load, but with increasing extension (i.e., strain)). In the strain hardening region, the load and the extension of the sample both continue to increase up to the failure point.

Figure 2:
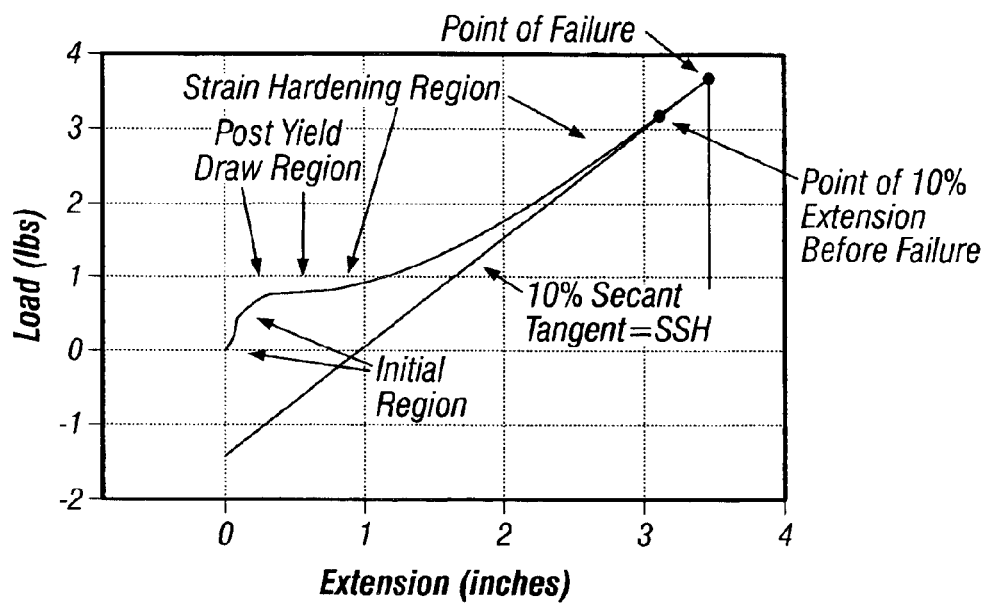
FIG. 2 shows the various regions of a typical tensile curve (as load in pounds versus extension in inches) and the particular region used to determine the slope of strain hardening.

FIG. 2 shows a tensile curve with the various stages of strain hardening as well as the slope of strain hardening. The slope of strain hardening is conveniently taken as the line representing a 10 percent secant tangent which is calculated from the failure point to the point at 10 percent extension before the failure point (where 10 percent extension before is equal to 90 percent of the total extension or strain).

A more precise methodology for calculating the slope of strain hardening is performing linear regression analysis using the tensile curve datapoints that represent the last 10 percent extension before the failure point.

The slope of strain hardening coefficient (SHC) is calculated according to the equation:

$$SHC = (\text{slope of strain hardening}) * (I_2)^{0.25}$$

where $I_2$ = melt index in grams/10 minutes, as determined in accordance with ASTM D-1238, Condition 190° C./2.16 kg.

For the first interpolymer or the second interpolymer or both, preferably the SHC is greater than or equal to 1.3, more preferably greater than or equal to about 1.5, especially in the range of from 1.3 to about 10, and most especially in the range of from about 1.5 to about 5. More preferably, the inventive diverse interpolymer composition itself is characterized as having a SHC greater than or equal to 0.85, most preferably greater than or equal to 0.95, most especially greater than or equal to 1.

The Second Ethylene Interpolymer

The second ethylene interpolymer can be a homogeneously branched ethylene interpolymer or a heterogeneously branched ethylene interpolymer. But, preferably, the second interpolymer is a heterogeneously branched (e.g., Ziegler polymerized) interpolymer of ethylene with at least one $C_3$–$C_{20}$ α-olefin (e.g., linear low density polyethylene (LLDPE)). By the term "heterogeneously branched ethylene interpolymer" it is meant the ethylene interpolymer has a SCBDI of less than 50 percent.

Heterogeneously branched ethylene interpolymers differ from the homogeneously branched ethylene interpolymers primarily in their branching distribution. For example, heterogeneously branched LLDPE polymers have a distribution of branching, including a highly branched portion (similar to a very low density polyethylene), a medium branched portion (similar to a medium branched polyethylene) and an essentially linear portion (similar to linear homopolymer polyethylene). The amount of each of these fractions varies depending upon the whole polymer properties desired. For example, linear homopolymer polyethylene has neither branched nor highly branched fractions, but is linear. A very low density heterogeneous polyethylene having a density from about 0.9 g/cm³ to about 0.915 g/cm³ (such as ATTANE™ copolymers, sold by The Dow Chemical Company and FLEXOMER® sold by Union Carbide Corporation) has a higher percentage of the highly short chain branched fraction, thus lowering the density of the whole polymer.

Heterogeneously branched ethylene interpolymers (such as DOWLEX® LLDPE resins sold by The Dow Chemical Company) have lower amounts of the highly branched fraction, but has a greater amount of the medium branched fraction. While ATREF will show homogeneously branched ethylene interpolymers typically are characterized by a single relatively narrow peak at some elution temperature, heterogeneously branched ethylene interpolymers like DOWLEX™ LLDPE 2045 resin have a broad branching distribution, as represented by the breadth of elution temperatures over which the polymer fractions elute. DOWLEX™ LLDPE 2045 resin also has a distinct peak at an elution temperature of about 98° C., indicating the "linear", "high density" or "crystalline" polymer fraction of the whole polymer.

Preferably, the heterogeneously branched ethylene interpolymer is a copolymer of ethylene with a $C_3$–$C_{20}$ α-olefin, wherein, more preferably, the copolymer has a density from about 0.93 g/cm³ to about 0.95 g/cm³, and most preferably a melt index ($I_2$) from about 0.1 g/10 min to about 500 g/10 min. Most especially, the heterogeneously branched interpolymer will have a density greater than 0.920 g/cc and especially greater than or equal to 0.935 g/cm³.

In particularly preferred embodiments, the heterogeneously branched interpolymer will have a density of no more than 0.95 g/cm³, more preferably no more than about 0.945 g/cm³, and most preferably no more than about 0.94 g/cm³. When the density of the heterogeneously branched interpolymer is no more than about 0.95 g/cm³, the interpolymer will typically be characterized by a molecular weight distribution ($M_w/M_n$) greater than 3, preferably at least 3.2, and more preferably at least 3.3. Further, when the density of the heterogeneously branched interpolymer is no more than about 0.95 g/cm³, the SCBDI, as defined above, is less than 50 percent and most commonly less than or equal to 45 percent.

The heterogeneously branched ethylene interpolymers used herein also have at least two melting points, as determined using Differential Scanning Calorimetry (DSC) between the temperature range of –30° to 150° C.

Manufacturing and Preparation

The compositions disclosed herein can be formed by any convenient method, including dry blending the individual components and subsequently melt mixing or by pre-melt mixing in a separate extruder (e.g., a Banbury mixer, a Haake mixer, a Brabender internal mixer, or a twin screw extruder).

Another technique for making the compositions in-situ is disclosed in pending U.S. Ser. No. 08/010,958, entitled Ethylene Interpolymerizations, which was filed Jan. 29, 1993 in the names of Brian W. S. Kolthammer and Robert S. Cardwell, the disclosure of which is incorporated herein in its entirety by reference. U.S. Ser. No. 08/010,958 describes, inter alia, interpolymerizations of ethylene and $C_3$–$C_{20}$ α-olefins using a homogeneous catalyst in at least one reactor and a heterogeneous catalyst in at least one other reactor. The reactors can be operated sequentially or in parallel.

The compositions can also be made by fractionating a heterogeneous ethylene interpolymer into specific polymer fractions with each fraction having a narrow composition (i.e., branching) distribution, selecting the fraction having the specified properties (e.g., SHC≧1.3), and blending the selected fraction in the appropriate amounts with another ethylene polymer. This method is obviously not as economical as the in-situ interpolymerizations of U.S. Ser. No. 08/010,958, but nonetheless can be used to obtain the present diverse interpolymer composition.

Fabricated Articles Made from the Inventive Diverse Interpolymer Composition

Many useful fabricated articles benefit from the diverse interpolymer composition disclosed herein. For example, molding operations can be used to form useful fabricated articles or parts from the compositions disclosed herein, including various injection molding processes (e.g., that described in Modern Plastics Encyclopedia/89, Mid October 1988 Issue, Volume 65, Number 11, pp. 264–268, "Introduction to Injection Molding" by H. Randall Parker and on pp. 270–271, "Injection Molding Thermoplastics" by Michael W. Green, the disclosures of which are incorporated herein by reference) and blow molding processes (e.g., that described in Modern Plastics Encyclopedia/89, Mid October 1988 Issue, Volume 65, Number 11, pp.217–218, "Extrusion-Blow Molding" by Christopher Irwin, the disclosure of which is incorporated herein by reference), profile extrusion, calendering, pultrusion (e.g., pipes) and combinations thereof. Rotomolded articles can also benefit from the novel compositions described herein. Rotomolding techniques are well known to those skilled in the art and include, for example, those described in *Modern Plastics Encyclopedia*/89, Mid October 1988 Issue, Volume 65, Number 11, pp.296–301, "Rotational Molding" by R. L. Fair, the disclosure of which is incorporated herein by reference).

Fibers (e.g., staple fibers, melt blown fibers or spun-bonded fibers (using, e.g., systems as disclosed in U.S. Pat. Nos. 4,340,563; 4,663,220; 4,668,566; 4,322,027, all of which are incorporated herein by reference), and gel spun fibers (e.g., the system disclosed in U.S. Pat. No. 4,413,110, incorporated herein by reference)), both woven and non-woven fabrics (e.g., spunlaced fabrics disclosed in U.S. Pat. No. 3,485,706, incorporated herein by reference) or structures made from such fibers (including, e.g., blends of these fibers with other fibers, e.g., PET or cotton)) can also be made from the inventive diverse composition disclosed herein. Elastic fibers comprising the inventive diverse interpolymer composition is a particularly preferred use.

Coatings, films and film structures (especially biaxial shrink films, lamination films and other films and film applications that require excellent toughness properties) particularly benefit from the inventive interpolymers compositions described herein. Such coatings, films and film structures can be made using conventional hot blown film fabrication techniques, cast extrusion, extrusion coating, coextrusion techniques, and biaxial orientation processes such as tenter frames or double bubble processes.

Conventional hot blown film processes are described, for example, in *The Encyclopedia of Chemical Technology*, Kirk-Othmer, Third Edition, John Wiley & Sons, New York, 1981, Vol. 16, pp.416–417 and Vol.18, pp.191–192, the disclosures of which are incorporated herein by reference. Biaxial orientation film manufacturing processes (for example, a "double bubble" process or a "trapped bubble" process) useful fabricate shrink film from the inventive composition are described in U.S. Pat. No. 3,456,044 (Pahlke), U.S. Pat. No. 4,352,849 (Mueller), U.S. Pat. No. 4,597,920 (Golike), U.S. Pat. No. 4,820,557 (Warren), U.S. Pat. No. 4,837,084 (Warren), U.S. Pat. No. 4,865,902 (Golike et al.), U.S. Pat. No. 4,927,708 (Herran et al.), U.S. Pat. No. 4,952,451 (Mueller), U.S. Pat. No. 4,963,419 (Lustig et al.), and U.S. Pat. No. 5,059,481 (Lustig et al.), the disclosures of each of which are incorporated herein by reference, can also be used to make film structures from the inventive diverse interpolymer composition described herein. The film structures can also be made using the tenter-frame technique, such as that conventionally used for oriented polypropylene.

Other multi-layer film manufacturing techniques for food packaging applications for which the present inventive composition is well suited are described in *Packaging Foods With Plastics*, by Wilmer A. Jenkins and James P. Harrington (1991), pp.19–27, and in "Coextrusion Basics" by Thomas I. Butler, *Film Extrusion Manual: Process, Materials, Properties* pp. 31–80 (published by TAPPI Press (1992)) the disclosures of which are incorporated herein by reference. The films may be monolayer or multilayer films. The film made from the inventive interpolymer compositions can also be coextruded with the other layer(s) or the film can be laminated onto another layer(s) in a secondary operation, such as that described in *Packaging Foods With Plastics*, by Wilmer A. Jenkins and James P. Harrington (1991) or that described in "Coextrusion For Barrier Packaging" by W. J. Schrenk and C. R. Finch, *Society of Plastics Engineers RETEC Proceedings*, Jun. 15–17 (1981), pp. 211–229, the disclosure of which is incorporated herein by reference. If a monolayer film is produced via tubular film (i.e., blown film techniques) or flat die (i.e., cast film) as described by K. R. Osborn and W. A. Jenkins in "Plastic Films, Technology and Packaging Applications" (Technomic Publishing Co., Inc. (1992)), the disclosure of which is incorporated herein by reference, then the film must go through an additional post-extrusion step of adhesive or extrusion lamination to other packaging material layers to form a multilayer structure. If the film is a coextrusion of two or more layers (also described by Osborn and Jenkins), the film may still be laminated to additional layers of packaging materials, depending on the other physical requirements of the final film. "Laminations Vs. Coextrusion" by D. Dumbleton, *Converting Magazine* (September 1992), the disclosure of which is incorporated herein by reference, also discusses lamination versus coextrusion. Monolayer and coextruded films can also go through other post extrusion techniques, such as a biaxial orientation process.

Other film applications that can use the inventive diverse interpolymer composition include pouches (especially via vertical form-fill-seal equipment), bags, sacks (for example, heavy-duty shipping sacks), stretch film (especially, stretch cling films), liners, diaper backsheets, tarps and canvases, bubble wrap, skin packaging films, blister packaging films and laminated films (for example, TYVEK film and decorative film).

Extrusion coating is yet another technique for producing multilayer structures using the inventive diverse interpolymer composition described herein. The inventive composition can comprise at least one layer of the structure. Similar to cast film, extrusion coating is a flat die technique. For example, a sealant layer (which the inventive interpolymer composition is also useful for) can be extrusion coated onto a substrate either in the form of a monolayer or a coextruded extrudate.

Generally, for a multilayer film or packaging structure, the inventive diverse interpolymer composition described herein comprises at least one layer of the total multilayer structure. Other layers of the multilayer structure include but are not limited to barrier layers, and/or tie layers, and/or structural layers. Various materials can be used for these layers, with some of them being used as more than one layer in the same film structure. Some of these materials include: foil, nylon, ethylene/vinyl alcohol (EVOH) copolymers, polyvinylidene chloride (PVdC), polyethylene terephthalate (PET), oriented polypropylene (OPP), ethylene/vinyl acetate (EVA) copolymers, ethylene/acrylic acid (EAA) copolymers, ethylene/methacrylic acid (EMAA) copolymers, LLDPE, HDPE, LDPE, nylon, graft adhesive polymers (for example., maleic anhydride grafted polyethylene), and paper. Generally, the multilayer film structures comprise from 2 to about 7 layers. Additives such as antioxidants (e.g., hindered phenolics (e.g., Irganox® 1010 made by Ciba Geigy Corp.), phosphites (e.g., Irgafos® 168 also made by Ciba Geigy Corp.)), cling additives (e.g., PIB), antiblock additives, slip agents, pigments, fillers, or combinations thereof, can be included in the formulations, to the extent that they do not interfere with the enhanced formulation properties discovered by Applicants.

EXAMPLE 1

In an evaluation to provide polymer blends with excellent toughness properties, several different ethylene interpolymers were obtained. These interpolymers all had relatively low $I_2$ melt indexes but they varied as to homogeneity, comonomer type, and density. Table 1 lists the various ethylene polymers used in the evaluation.

TABLE 1

| Resin | | Interpolymer Type | $I_2$, Melt Index | Density, g/cc | Comonomer Type |
|---|---|---|---|---|---|
| A | 389-S | homogeneously branched | 0.82 | 0.871 | 1-butene |
| B | 389-F | homogeneously branched | 0.97 | 0.869 | 1-octene |
| C | DOWLEX 2045 | heterogeneously branched | 1.0 | 0.920 | 1-octene |
| D | DOWLEX 2037 | heterogeneously branched | 2.4 | 0.934 | 1-octene |
| E | AFFINITY PL1840 | homogeneously branched | 0.97 | 0.909 | 1-octene |
| F | DOWLEX 2038 | heterogeneously branched | 0.93 | 0.935 | 1-octene |
| G | SCLAIR 14B | heterogeneously branched | 1.66 | 0.936 | 1-butene |

The ethylene interpolymers were tumble dry blended at various weight percents and extruded at about 200° C. on a 15 mm co-rotating twin-screw extruder to provide several two component polymer blends. The individual interpolymers and the interpolymer polymer blends were compression molded and tested to determine their respective intrinsic tear performance. Also, Resin B, Resin E and Resin F were tested using dogbones according to FIG. 1A to determine their respective slope of strain hardening coefficient. Table 2 provides the designation of the single polymer compositions, the description of the polymer blends and resultant properties for both.

Figure 3:
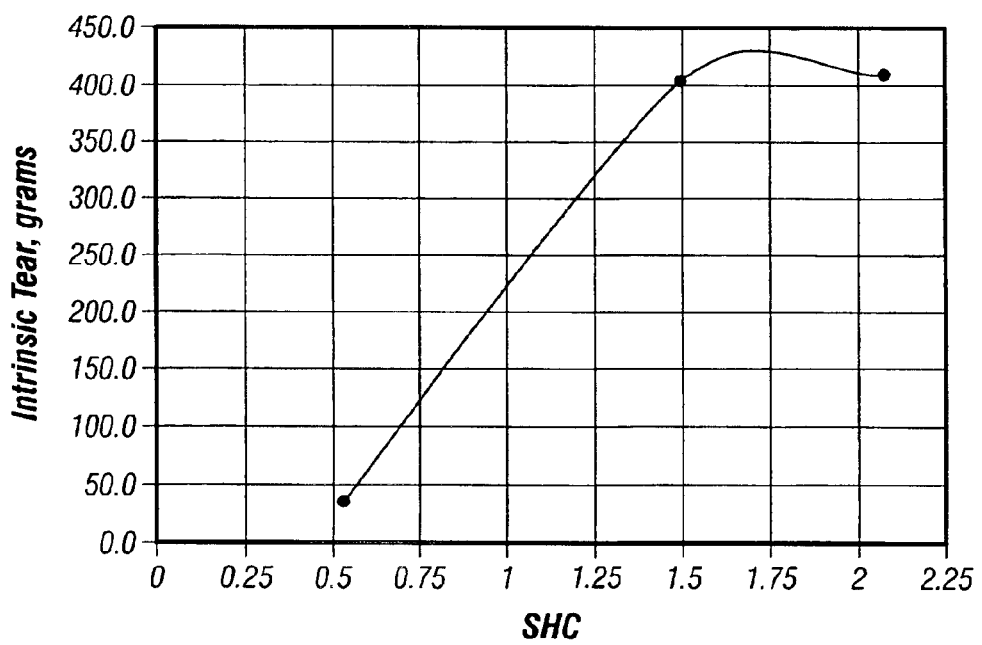
FIG. 3 shows the relationship between intrinsic tear (in grams) and the slope of strain hardening coefficient (SHC) for two homogeneously branched ethylene/1-octene copolymers and one heterogeneously branched ethylene/1-octene copolymer.

From the data in Table 2, FIG. 3–9 were generated. FIG. 3 shows the relationship between intrinsic tear (in grams) and the slope of strain hardening coefficient (SHC) for two heterogeneously branched ethylene/1-octene.

copolymers (Resin C and Resin F) and one homogeneously branched ethylene/1-octene copolymer (Resin E). While this figure was generated using single or component interpolymers (and without being held to any particular theory), we believe FIG. 3 is also applicable to polymer blends, especially those polymer blends that are not characterized by synergistic toughness properties.

Figure 4:
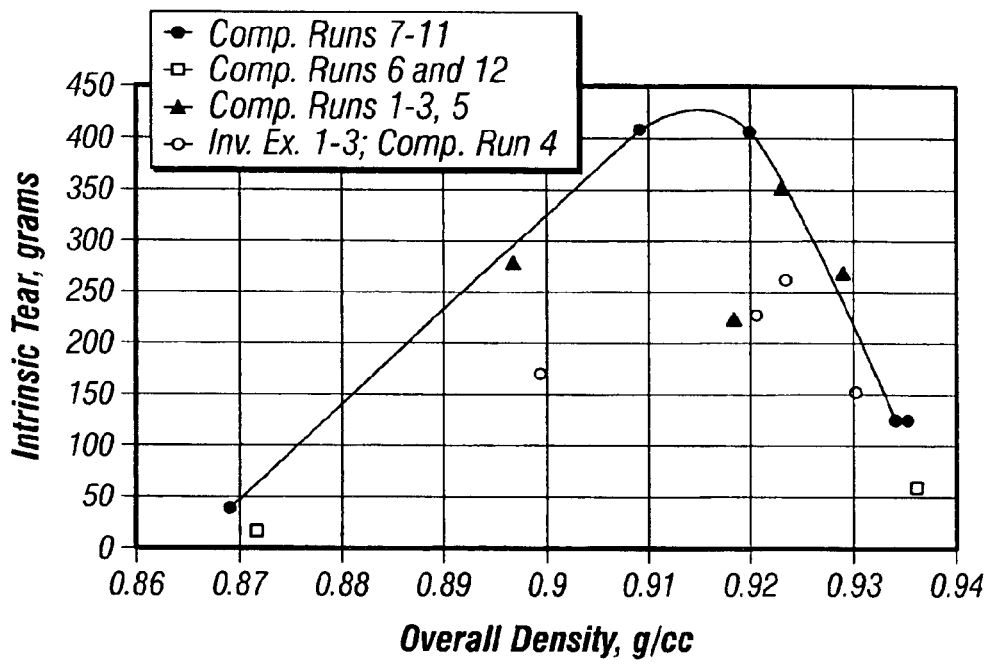
FIG. 4 shows the relationship between intrinsic tear (in grams) and the overall density (in grams per cubic centimeter) for various single polymer and polymer blend compositions, including inventive interpolymer combinations.

FIG. 4 shows the relationship between intrinsic tear (in grams) and the overall density (in grams per cubic centimeter) for various single polymer and polymer blend compositions, including inventive interpolymer combinations (Inventive Example 1, Inventive Example 2 and Inventive Example 3). FIG. 4 shows Inventive Example 1 (which had an intrinsic tear of 229.4 grams) exhibited toughness that approximated the "mixing rule" response. That is, the intrinsic tear of Inventive Example 1 was within 29 percent of the value calculable from corresponding component interpolymers.

Similarly, FIG. 4 shows Inventive Example 2 (which had an intrinsic tear of 264.1 grams) exhibited toughness that approximated the "mixing rule". The intrinsic tear of Inventive Example 2 was within 33 percent of that predictable based on fractional weight average calculations using corresponding interpolymers. Inventive Example 2 was also within 33 percent of the intrinsic tear performance of a polymer blend made of two interpolymers, each comprised of the same comonomer (comparative run 2).

FIG. 4 also shows Inventive Example 3 (which had an intrinsic tear of 229.4 grams) exhibited toughness that was equivalent to that of a polymer blend made of two interpolymers, each comprised of the same comonomer (comparative run 3).

The results for Inventive Example 1, Inventive Example 2 and Inventive Example. 3 was a surprising unexpected result because these dual interpolymer blends all comprises one ethylene interpolymer which is comprised of a lower α-olefin while the "mixing rule" comparison in FIG. 4 consists of a higher α-olefin single polymer and the polymer blend comparisons set forth in FIG. 4 consist of two higher α-olefin interpolymers and higher α-olefin interpolymers can well known to exhibit improved toughness relative to lower α-olefin interpolymers. The fact that comparable or equivalent toughness can be accomplished using combinations with a lower α-olefin is extremely surprising and unexpected.

Figure 5:
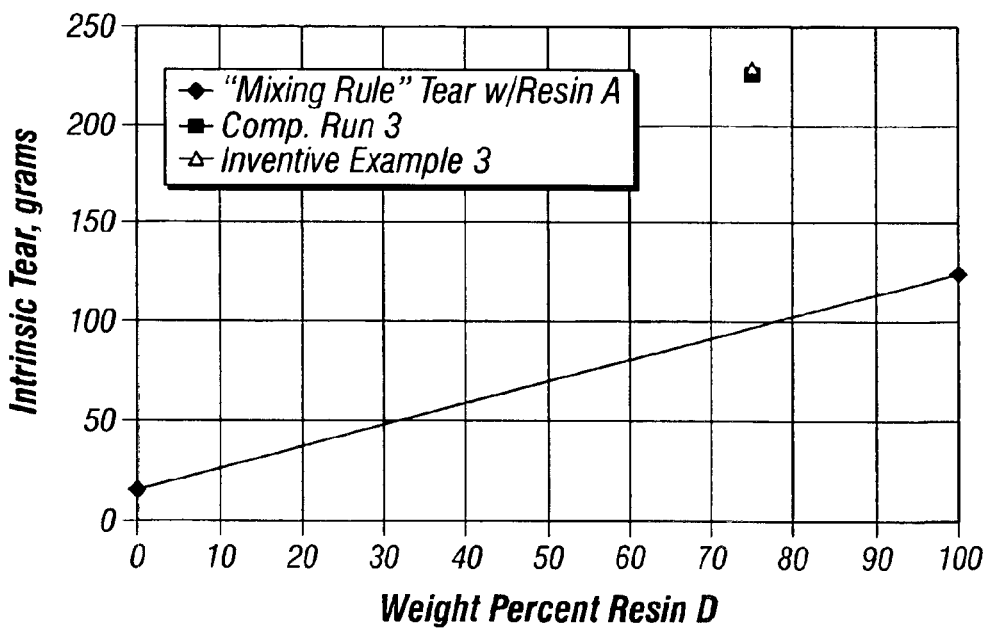
FIG. 5 shows, in regard to intrinsic tear (in grams), how dissimilar and similar interpolymer combinations compare to a "mixing rule" polymer blend of a homogeneously branched ethylene/1-butene copolymer (having a 0.8714 g/cc density) and heterogeneously branched ethylene/1-octene copolymer (having a 0.934 g/cc density).

FIG. 5 and FIG. 6 show that the intrinsic tear performance of Inventive Example 3 is substantially higher that predict-

TABLE 2

| Example | Composition | Overall Density, g/cm³ | Intrinsic Tear, gm-force | SHC | Yield Stress, psi | Yield Stress STD, psi | Ultimate Stress, psi | Ultimate Stress STD, psi | Energy at Break, psi | Energy at Break STD, psi |
|---|---|---|---|---|---|---|---|---|---|---|
| Inv. Ex 1 | 25% Resin E + 75% Resin G | 0.9303 | 154.5 | ND | 2,289 | 52 | 3,288 | 255 | 341 | 27 |
| Comp Run 1* | 25% Resin E + 75% Resin F | 0.9288 | 271.2 | ND | 2,284 | 33 | 4,485 | 200 | 407 | 30 |
| Inv. Ex 2 | 50% Resin E + 50% Resin G | 0.9233 | 264.1 | ND | 1,824 | 37 | 3,999 | 145 | 385 | 19 |
| Comp Run 2* | 50% Resin E + 50% Resin F | 0.9230 | 350.4 | ND | 1,770 | 30 | 3,958 | 426 | 328 | 46 |
| Inv. Ex 3 | 25% Resin A + 75% Resin D | 0.9206 | 229.4 | ND | 1,752 | 15 | 3,541 | 229 | 346 | 27 |
| Comp Run 3* | 25% Resin B + 75% Resin D | 0.9181 | 227.0 | ND | 1,702 | 52 | 3,481 | 172 | 325 | 26 |
| Comp Run 4* | 45% Resin A + 55% Resin C | 0.8992 | 172.6 | ND | 683 | 32 | 2,774 | 274 | 215 | 29 |
| Comp Run 5* | 45% Resin B + 55% Resin C | 0.8964 | 281.2 | ND | 708 | 24 | 2,623 | 156 | 217 | 16 |
| Comp Run 6* | 100% Resin A | 0.8714 | 14.8 | ND | 139 | 3 | 1,463 | 99 | 121 | 11 |
| Comp Run 7* | 100% Resin B | 0.8688 | 35.9 | ND | 131 | 7 | 1,479 | 78 | 105 | 6 |
| Comp Run 8* | 100% Resin C | 0.920 | 405.6 | 1.5 | 1,637 | 38 | 3,813 | 116 | 307 | 13 |
| Comp Run 9* | 100% Resin D | 0.934 | 125.7 | ND | 2,735 | 69 | 4,043 | 167 | 382 | 20 |
| Comp Run 10 | 100% Resin E | 0.909 | 410.7 | 2.1 | 1,030 | 21 | 3,882 | 208 | 289 | 23 |
| Comp Run 11* | 100% Resin F | 0.935 | 124.9 | 0.55 | 2,781 | 49 | 4,335 | 558 | 406 | 67 |
| Comp Run 12 | 100% Resin G | 0.936 | 60.0 | ND | 2,566 | 63 | 2,327 | 80 | 200 | 11 |

*not an example of the present invention; provided for comparison only.
ND denotes "not determined".
STD denotes standard deviation.

able according to the "mixing rule" and equivalent to a same-comonomer polymer blend (comparative run 3).

FIG. 7 and FIG. 8 show that the intrinsic tear performance of Inventive Example 1 and Inventive Example 2 are substantially comparable to that predictable by the "mixing rule".

FIG. 9 shows that at an overall composition density of 0.8992 g/cm³, a polymer blend comprised of two interpolymers, each having a different comonomer (comparative run 4) does not result in a final combination that exhibits good toughness. The intrinsic tear of comparative run 4 is substantially lower than that predicted by the "mixing rule" and substantially lower than that of a polymer blend comprised of two interpolymers, each comprising a higher α-olefin comonomer (comparative run 5).

We claim:

1. A polymer blend comprising:
   (A) from about 5 percent (by weight of the total composition) to about 95 percent (by weight of the total composition) of at least one first ethylene interpolymer having at least one first comonomer, and
   (B) from about 95 percent (by weight of the total composition) to about 5 percent (by weight of the total composition) of at least one second ethylene interpolymer having at least one second comonomer;
   wherein the difference in the number of carbon atoms in the at least one first comonomer of the first interpolymer and the at least one second comonomer of the second interpolymer is at least two,
   wherein at least one of the first interpolymer or the second interpolymer is characterized by a molecular weight distribution of from about 1.8 to about 2.8; and
   wherein the polymer blend is characterized as having a density greater than or equal to 0.90 g/cm$^3$.

2. The polymer blend according to claim 1 wherein the first interpolymer has a density that is less than a density of the second interpolymer,
   wherein the polymer blend has an intrinsic tear value within 35% of the intrinsic tear value of a comparative polymer blend comprising two comparative interpolymers wherein each of the two comparative interpolymers have the same higher carbon number comonomer.

3. The polymer blend of claim 2, wherein the polymer blend has a density from about 0.90 g/cc to about 0.935 g/cc.

4. The polymer blend of claim 2, wherein the first density is from about 0.89 g/cc to about 0.935 g/cc and the second density is from about 0.93 g/cc to about 0.95 g/cc.

5. The polymer blend of claim 2, wherein the intrinsic tear value is about 150 grams-force.

6. The polymer blend according to claim 1 wherein the comonomers are selected from the group consisting of 1-octene, 1-hexene and 4-methyl, 1-pentene.

7. The polymer blend according to claim 1 wherein one interpolymer is a homogeneously branched ethylene interpolymer and the other interpolymer is a heterogeneously branched ethylene interpolymer or a homogeneously branched ethylene interpolymer.

8. The polymer blend of claim 1 wherein the first interpolymer is a homogeneously branched interpolymer wherein the comonomer has fewer carbons than the comonomer of the second interpolymer.

9. The polymer blend of claim 1 wherein the first interpolymer is a substantially linear interpolymer.

10. The polymer blend of claim 1 wherein at least one of the first interpolymer or the second interpolymer is characterized by a molecular weight distribution of from about 3.0 to about 3.3.

11. The polymer blend according to claim 2 wherein the homogeneously branched ethylene interpolymer has a slope of strain-hardening coefficient greater than or equal to about 1.3.

12. The polymer blend according to claim 1 wherein the first interpolymer is a homogeneous interpolymer having a molecular weight distribution of from about 1.8 to about 2.8 and the second interpolymer is heterogeneously branched ethylene interpolymer having a molecular weight distribution of from about 3.0 to about 3.3.

13. The polymer blend according to claim 12 wherein the heterogeneously branched ethylene interpolymer is a heterogeneously branched linear ethylene interpolymer.

14. The polymer blend according to claim 1 wherein the first interpolymer is a substantially linear ethylene/α-olefin copolymer.

15. The polymer blend according to claim 1 wherein the composition is further characterized as having an intrinsic tear value greater than or equal to 150 grams-force.

16. The polymer blend according to claim 1 wherein the composition is further characterized as having an intrinsic tear value greater than or equal to 200 grams-force.

17. The polymer blend according to claim 1 wherein the composition is further characterized as having a slope of strain-hardening coefficient (SHC) greater than or equal to 0.85.

18. The polymer blend according to claim 1 wherein the composition is further characterized as having a slope of strain-hardening coefficient (SHC) greater than or equal to 0.95.

19. An article of manufacture comprising the polymer blend of claim 1.

20. The article of claim 19, wherein the article is a film, fiber, a molding, a coating, a profile, a pouch, a sealant film layer, a carpet backing, a liner, a shrink film, a stretch film, an extrusion coating, a laminating film, a rotomolding, a sack, or a pouch.

* * * * *

UNITED STATES PATENT AND TRADEMARK OFFICE
CERTIFICATE OF CORRECTION

PATENT NO. : 6,906,141 B2 Page 1 of 1
APPLICATION NO. : 10/790337
DATED : June 14, 2005
INVENTOR(S) : Pak-Wing S. Chum et al.

It is certified that error appears in the above-identified patent and that said Letters Patent is hereby corrected as shown below:

Column 1

Lines 5-12, "This is a continuation application of U.S. patent application Ser. No. 09/430,919, now U.S. patent 6,723,398, filed Nov. 1, 1999, which claims benefit of U.S. patent appl. Ser. Nos. 08/927,393, filed Aug. 27, 1997, and 08/544,497, now issued U.S. Pat. No. 5,677,383, filed Oct. 5, 1995, each of which is incorporated by reference herein in its entirety. "Should read -- This is a continuation application of U.S. patent application Ser. No. 09/430,919, now U.S. Pat. No. 6,723,398, filed Nov. 1, 1999, which is incorporated by reference herein in its entirety.--

Signed and Sealed this

Sixteenth Day of January, 2007

JON W. DUDAS
*Director of the United States Patent and Trademark Office*